United States Patent [19]

Strowik

[11] 4,332,418
[45] Jun. 1, 1982

[54] ADJUSTABLE HINGE MOUNT FOR SEATS HAVING RECLINABLE BACKREST, PARTICULARLY MOTOR VEHICLE SEATS

[75] Inventor: Willibald Strowik, Remscheid-Lennep, Fed. Rep. of Germany

[73] Assignee: Keiper Automobiltechnik GmbH & Co. KG, Remscheid, Fed. Rep. of Germany

[21] Appl. No.: 102,943

[22] Filed: Dec. 12, 1979

[30] Foreign Application Priority Data

Dec. 18, 1978 [DE] Fed. Rep. of Germany ....... 2854636

[51] Int. Cl.³ .................... A47C 1/025; A47C 1/027
[52] U.S. Cl. ................................. 297/362; 297/374
[58] Field of Search ............ 297/362, 373, 374, 354, 297/355; 16/140, 143

[56] References Cited

U.S. PATENT DOCUMENTS 3,479,088 11/1969 Bonnaud .................... 297/362 X
3,823,440 7/1974 Klingelhofer ................ 297/374

FOREIGN PATENT DOCUMENTS 477631 1/1938 United Kingdom ............ 297/373

Primary Examiner—William E. Lyddane
Attorney, Agent, or Firm—Michael J. Striker

[57] ABSTRACT

The adjustable hinge mount for seats having a reclinable backrest includes a pivot axle rigidly connected at one end thereof to the hinge mount member assigned to the seat proper and supporting for rotation an eccentric disk which in turn supports the tiltable hinge mount member assigned to the backrest and being formed with a spur gear which engages the inner gear of the wobble gear assembly formed on the seat hinge mount. The threaded pin of the pivot axle engages a locking nut controlled by a spring biased and hand operated lever which normally brings the locking nut into engagement with the face of the eccentric disk and rigidly connects the same to the pivot axle so that the reclinable backrest is arrested in its adjusted angular position.

12 Claims, 6 Drawing Figures

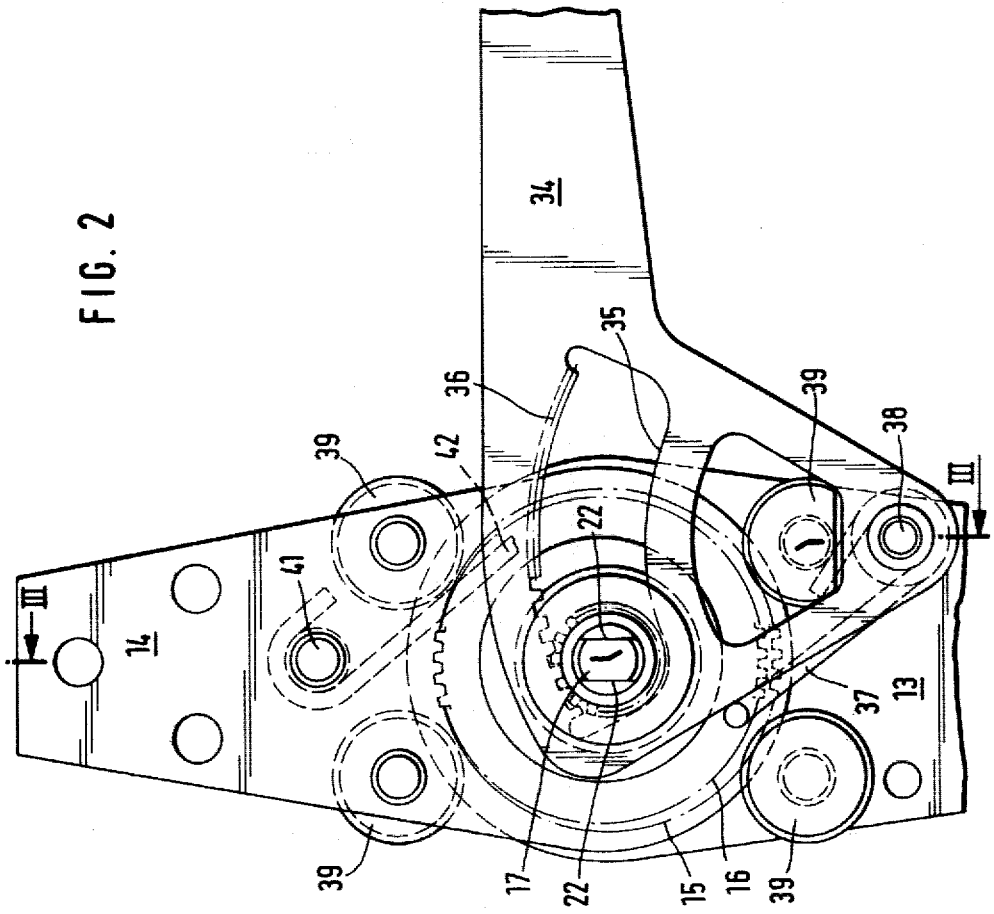
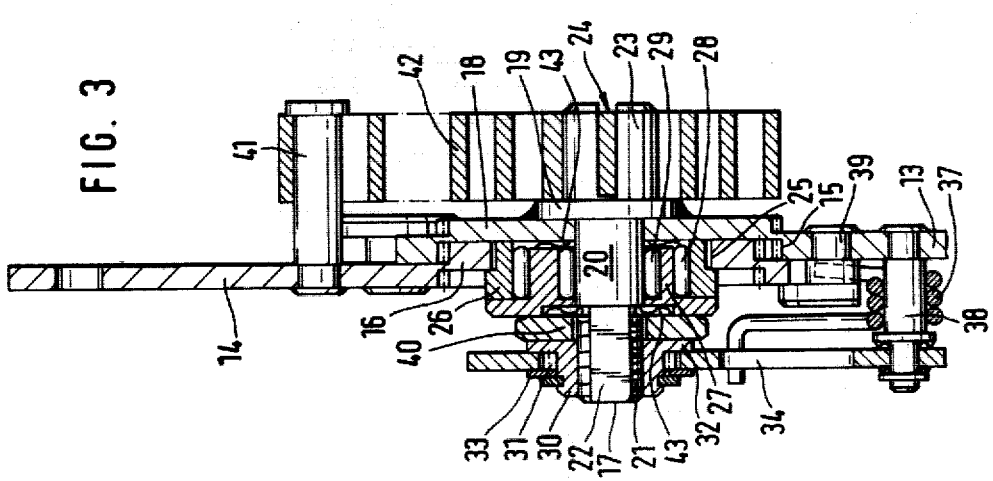

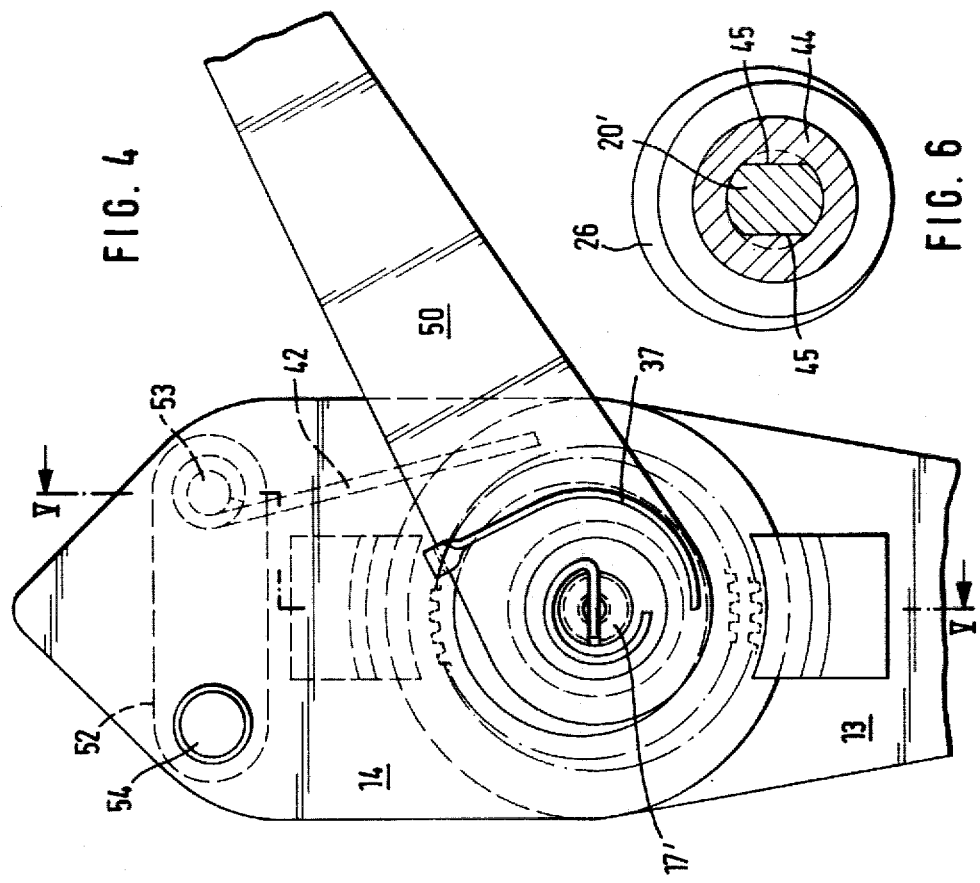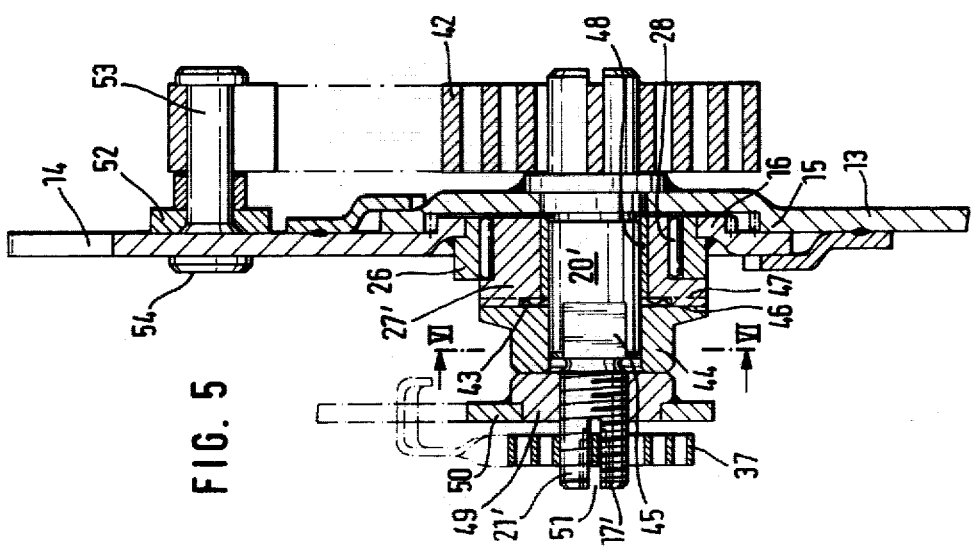

ADJUSTABLE HINGE MOUNT FOR SEATS HAVING RECLINABLE BACKREST, PARTICULARLY MOTOR VEHICLE SEATS

BACKGROUND OF THE INVENTION

This invention relates generally to seat adjusters and more particularly it relates to an adjustable hinge mount for seats having reclinable backrest, such as motor vehicle seats, wherein a fixed hinge mount member is attached to the seat proper and a tiltable hinge mount member is attached to the backrest, the two hinge mount members being coupled one to another by means of a wobble gear having one of its gears supported for rotation on an eccentric sleeve which in turn is rotatable on a pivot axle projecting from one of the hinge mount members and the other gear of the wobble gear assembly is connected to the other hinge mount member.

In a known adjustable hinge mount of this type the pivot axle has the form of a hollow cylinder to accommodate in its interior a hand operated thrust bolt which in axial direction is rigidly connected to the eccentric sleeve to be axially displaced against the force of a resetting spring acting in the arresting direction. The eccentric sleeve has several sections eccentrically arranged relative to the pivot axle whereby one of the sections in the case of arresting the wobble gear enters an eccentric bore in that hinge mount member which is connected to the spur gear of the wobble gear assembly. Upon shifting axially the first bolt in the releasing direction the eccentric section is withdrawn from the eccentric bore in the aforementioned hinge mount member and as a result the spur gear formed on the hinge mount member which is connected to the backrest is permitted to roll in mesh with the inner gear of the fixed hinge mount member as soon as a force is applied in one or the other rotational direction on the backrest. when the eccentric sleeve is withdrawn from the bore of the spur gear, the circumference of another eccentric section of the sleeve rests on a flanged bearing formed on the spur gear and having an eccentric bore relative to the pivot axle. At the same time, the concentric bore of the eccentric sleeve is supported for rotation on the pivot axle by means of a roller bearing. In this manner it is ensured that the eccentric sleeve upon its withdrawal from the bore of the spur gear performs a synchronous wobbling movement relative to the spur gear which holds in mesh with the inner gear of the wobble gear assembly. In this manner, the front eccentric section of the eccentric sleeve which is rigidly connected to the thrust bolt can always in the axially released position of the latter locate the eccentric bore of the spur gear in order to establish a new locking connection between the spur gear and the inner gear of the wobble gear assembly. Accordingly, to enable an readjustment of the backrest, the thrust bolt and thus the eccentric sleeve have to be displaced in axial direction against the force of a resetting spring whereby in addition to the spring there act also the frictional forces between the eccentric section of the sleeve and the bore in the spur gear and also the resisting forces acting during the insertion of the eccentric sleeve into the flanged bearing and into the bearing of the pivot shaft. The magnitude of the force applied by the user of the seat in horizontal direction, nonetheless, is limited inasmuch as the seat user cannot apply his own weight for exerting a force acting in the horizontal direction. For these reasons, the operation of such known adjustable hinge mounts for a speedy adjustment of backrests is not always easy to be performed by any user of the seat.

SUMMARY OF THE INVENTION

It is, therefore, a general object of the present invention to overcome the aforementioned disadvantages.

More particularly, it is an object of the invention to provide such an improved adjustable hinge mount of the aforedescribed type which, while maintaining the capability of the speed of adjustment requires a relatively small force for its manual operation.

Another object of this invention is to provide such an improved adjustable hinge mount which is simple in structure and requires relatively few component parts.

In keeping with these objects and others which will become apparent hereafter, one feature of the invention resides, in an adjustable hinge mount of the above-described type, in the provision of means which selectively lock the eccentric sleeve against the pivot axle to arrest the reclinable backrest in an adjusted angular position relative to the seat part. In this manner, the eccentric sleeve can remain in the eccentric bore of the spur gear of the wobble gear assembly both in its locking position and in its adjusting position. In this adjusting position the only care to be taken is that the eccentric sleeve be easily rotatable on the fixed pivot axle and in the eccentric bore of the spur gear whereas in the locking position the eccentric sleeve has to be locked against rotation on the pivot axle. This condition is preferably attained in such a manner that the pivot axle is rigidly connected to the hinge mount member assigned to the seat proper and has its end portion projecting from the eccentric sleeve in the form of a threaded pin engaging a locking nut controlled by control lever for selectively arresting the eccentric sleeve to the pivot axle.

According to another feature of this invention a non-rotatable but axially displaceable pressure disk is arranged on the pivot axle between the locking nut and the eccentric sleeve and the purpose of this pressure disk is to keep rotary forces off locking nut when the eccentric sleeve is in the locked condition. In this way the rotary forces acting on the eccentric sleeve are transmitted on the pressure disk which is nonrotatably supported on the pivot axle, for example by means of noncircular central opening thus transmitting directly these rotary forces into the fixed pivot axle and preventing these forces from acting on the locking nut which they might bring to a loose state. Accordingly, the locking nut when in locking position is acted upon by axial forces only.

To hand operate the locking nut, the latter is provided, according to another feature of this invention, with outer teeth which are in engagement with a tooth segment of a control lever. In a modification, the locking nut could be of course coupled to a control lever biased in the locking direction. It is of advantage when the control lever is operable only for releasing the connection between the eccentric sleeve and the pivot axle and as soon as the control lever upon reaching its adjusting position is released by the operator, it swings back into its initial position in which the locking nut is turned back into its clamping position. For this purpose the control lever is loaded preferably in the arresting direction by a biasing spring.

The locking connection between the eccentric sleeve and the fixed pivot axle is established by the friction contact between the faces of the eccentric sleeve and the pressure disk. Nonetheless, in order to make the locking contact between the sleeve and the axle independent from the locking force, the facing surfaces of the pressure disk and of the eccentric sleeve can be provided, according to still another feature of this invention, with radial serrations. The engagement between the sleeve and the pressure disk by means of the radial serrations or teeth requires namely very small compressing forces exerted by the locking nut. According to still another modification of this invention, there are provided spring elements between the sleeve and the pressure disk on the one hand and between the sleeve and the adjoining hinge mount member on the other hand which ensure that upon loosening the locking nut the pressure disk reliably disengages the eccentric sleeve. Preferably, the spring elements which act in axial direction of the pivot axle are made in the form of corrugated spring disks.

In using a locking nut which is provided on its periphery with a spur gear engaging a tooth rack of a control lever, it is of advantage when the latter is pivotably supported on the hinge mount member assigned to the seat part and resiliently displaceable in axial direction. The control lever is thus kept free from axial forces resulting from the releasing movement of the locking nut since its point of engagement is movable in axial direction together with the movement of the locking nut.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a side view on an enlarged scale, of the hinge mount as illustrated in FIG. 1;

FIG. 3 is a sectional front view of the hinge mount of FIG. 2 taken along the line III—III;

FIG. 4 is a side view of another embodiment of the hinge mount of this invention;

FIG. 5 is a sectional front view of the hinge mount of FIG. 4 taken along the line V—V; and FIG. 6 is a sectional side view of a locking nut in the hinge mount of this invention, taken along the line VI—VI of FIG. 5.

DESCRIPTION OF THE PREFERRED EMBODIMENTS

Figure 1:
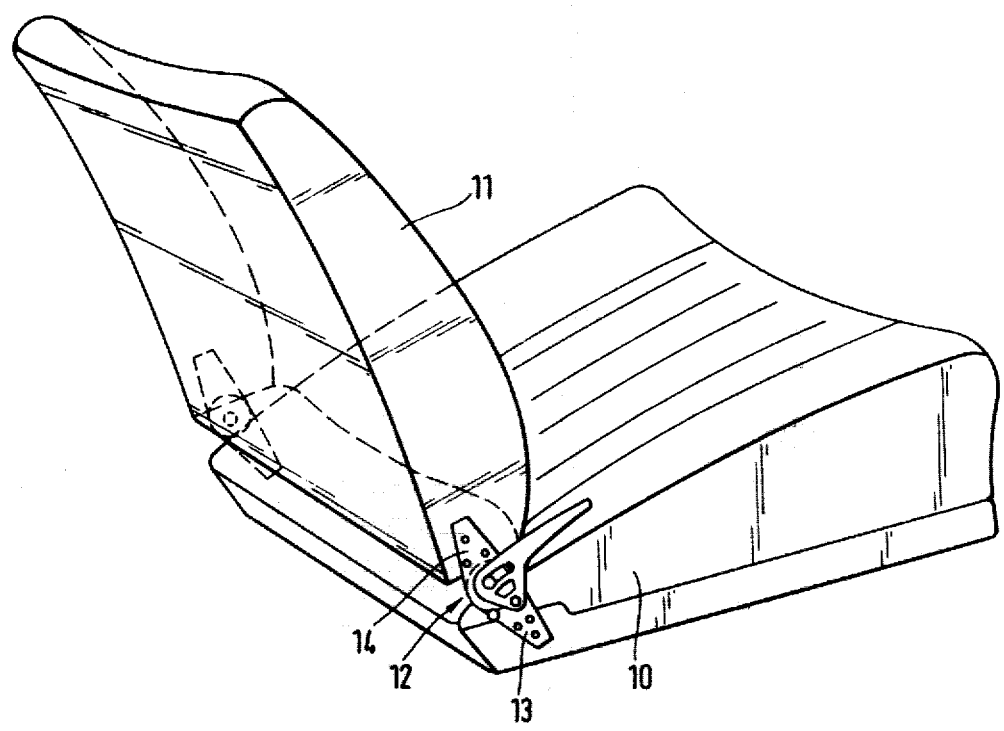
FIG. 1 is a perspective view of a motor vehicle seat equipped with the adjustable hinge mount of this invention.

The motor vehicle seat as illustrated in FIG. 1 includes a seat part 10 and a reclinable backrest 11. The backrest and the seat part are linked together by an adjustable hinge mount 12 having a fixed hinge mount member 13 attached to the seat part 10 and a tiltable hinge mount member 14 attached to the backrest. The fixed hinge mount member 13 is formed with an inner gear 15 and the tiltable hinge mount member 14 is formed with a spur gear 16 engaging the inner gear and forming a part of a wobble gear assembly. The radius of the crown circle of the spur gear 16 is shorter at least about the height of one tooth than that of the root circle of the inner gear 15. On the opposite lateral side of the seat the backrest can be linked to the seat part via a simple hinge mount facilitating the reclining movement of the backrest.

Referring now to FIGS. 2 and 3, a pivot axle 17 is arranged concentrically relative to the inner gear 15 of the stationary hinge mount member 13. The axle 17 passes through the center of the embossed circular wall portion 18 of the fixed member 13 where it is provided with a flange 19 which is secured to the outer surface of the wall portion 18 by welding.

The axle 17 is stepped to define a bearing section 20 which extends through the wall portion 18 of the hinge member 13. The outwardly projecting end portion of the axle 17 is in the form of a threaded pin 21 which in this embodiment as seen mostly from FIG. 2, has two opposite flat surfaces 22. The opposite end portion of axle 17 projecting from the flange 19 is also in the form of a projecting pin which is provided with a diametrical slot 24. The spur gear 16 formed on the tiltable hinge mount member 14 encloses the splined bore 25, the center of which is offset from the central axis of the pivot axle 17. The spline bore 25 engages a splined peripheral section of a bearing sleeve 26 so that the latter is axially displaceable and coupled for joint rotation with the spur gear 16. The cylindrical inner wall of the bearing sleeve 26 supports for rotation an eccentric sleeve 27 which in order to reduce the bearing friction is provided with an outer ring of bearing rollers 28 arranged between the outer periphery of the eccentric sleeve 27 and the inner wall of the bearing sleeve 26. The eccentric sleeve 26 is supported for rotation by means of an inner ring of bearing rollers 29 on the bearing section 20 of the pivot axle 17. The inner end face of the eccentric sleeve 27 is situated in close proximity to the inner wall of the embossed wall portion of the member 13 whereas the outer end of the sleeve 27 is formed with a collar which rests on the outer end face of the bearing sleeve 26. The threaded pin 21 of the axle 17 extends outwardly from the center of the eccentric sleeve 27 and supports a locking nut 30 which in this embodiment is provided on its periphery with an outer gear 31. This outer gearing 31 is held in position by an end flange 32 formed on the end of locking nut opposite the eccentric sleeve 27, and a step ring 33 secured on the nut 30 by a safety ring 31.

A hand operated control lever 34 in the form of a bell crank is pivotably supported on a pivot pin 38 and is provided with a cutout 35 in the form of a circular segment which on its upper edge defines a tooth rack 36 engaging the outer gear 31 on the locking nut 30. In FIGS. 2 and 3, the control lever 34 is illustrated in its locking position in which it is held by a torsion spring 37. This spring 37 is wound around the pivot pin 38 for the control lever and at one end thereof abuts against a guide bolt 39 which ensures the axial contact of the two hinge mount members 13 and 14. The other end of the spring 37 rests on the control lever 34 and urges the same into its locking position. Since during the rotation of the locking nut 30 the same performs also an axial displacement, the control lever 34 must also be capable of following this axial movement in order to prevent bending stresses in the lever. For this reason the control lever 34 is supported on pin 38 not only for rotation but also for an axle displacement, for example by means of spring disks which are resilient in axial direction. Between the flange 32 of the nut 30 and the collar of the eccentric sleeve 27 is also arranged a pressure ring or disk 40 having a noncircular central bore which permits an axial displacement of the disk 40 along the thread surfaces 22 of the pin 21 but rotates jointly with the latter.

Another spiral spring 42 is attached at one end thereof to a bolt 41 which is resiliently connected to the hinge mount part 14 assigned to the backrest. The inner end of the spring 42 is mounted in the diametrical slot 24 of the axle 17.

In order to keep friction exerted against the eccentric sleeve 27 during release position of the nut as low as possible, there are arranged between the pressure disk 40 and the eccentric sleeve 27 on the one hand and between the eccentric sleeve and the circular wall portion 18 of the hinge mount part 14 on the other hand resilient member 43 such as for example corrugated spring disk which resiliently act in the axial direction.

When the control lever 34 is in position as illustrated in FIG. 2, the locking nut 30 is screwed on the threaded pin 21 against the pressure disk 40 which in turn is compressed against the collar of the eccentric sleeve 27 which in turn is pressed against the face of the bearing sleeve 26 coupled for joint rotation with the spur gear 16 of the tiltable mount member 14. Due to the friction contact between the eccentric disc 27, bearing sleeve 26 and wall portion 18 of hinge member 13 introduced by the pressure disk 40 the disk 27 is firmly coupled to the pivot axle 17 and prevents any angular displacement of the hinge mount member 14 relative to the hinge mount member 13. If the control lever 34 is now lifted counterclockwise, its movement is transmitted via the tooth segment 36 and the outer gear 31 to the locking nut 30 which also rotates counterclockwise and simultaneously moves on the threaded pin 21 in axial direction to the left. In doing so, the corrugated spring disk 43 displace the pressure disk 40 from the collar of the eccentric disk 27 and at the same time the opposite side of the collar of the eccentric disk 27 is disengaged from the face of the externally splined bushing 26. In this manner, the connection between the eccentric sleeve 27 and the pivot axis 17 is interrupted and the sleeve may now freely rotate relative to the bearing section 20 on the axle 17 and to the spur gear 16 and an adjusting force is applied in a tangential direction on the hinge mount part 14. This adjusting force is exerted when the occupant of the seat presses his back against the backrest of the seat or when the backrest is unloaded by the spiral spring 42 urging the backrest which is rigidly connected to the hinge mount part 14, to its starting position. When in the course of such adjusting movements of the backrest during the lifted position of the control lever 34 the latter is released at the moment when the backrest has attained the desired angular position, the torsion spring 37 returns the control lever 34 to its normal position as illustrated in FIG. 2 and causes the locking nut 30 to turn clockwise on the threaded pin 21 and thus to be displaced axially all the way to the right. As a result, the pressure disk 40 abuts against the face of the eccentric sleeve 27 and firmly couples the latter to the pivot axis 17 so that the hinge member 14 is arrested in the adjusted position relative to the hinge mount member 13.

In the embodiment as illustrated in FIGS. 4 and 5, the hinge mount members 13 and 14 are similarly as in the preceding example interconnected by a pivot axle 17' which, however, in contrast to the pivot axle 17 as illustrated in FIG. 3 has a longer bearing section 20' which supports for rotation not only the eccentric disk 27' but also the pressure ring or plate 44. For this reason, the part of the bearing section 20' which exceeds the eccentric disk 27' is shaped with opposite flat surfaces 45 which, as seen from FIG. 6, are in engagement with the correspondingly shaped inner surface portions of the bore of the pressure ring 44. The facing surfaces of the pressure plate 44 and of the eccentric disk 27' are provided with radial serrations 46 and 47 which normally engage each other so that the pressure disk 44 and the eccentric disk 27' are positively coupled one to another irrespective of frictional forces. The eccentric outer periphery of the disk 27' is supported for rotation in the bushing 26 of the hinge mount part 14 by means of a roller bearing 28, similarly as in the preceding example, the central bore of the eccentric disk 27' is supported for rotation on the bearing section 20' by means of a journal bearing bushing 48. As seen from FIG. 5 the locking nut 39 in this embodiment has no outer teeth but is rigidly connected to the control lever 50. The lever 50 is also spring biased in locking direction by a spring 37 in the form of a spiral spring one end of which engages the control lever 50 and the other end of which is inserted in a slot 51 of the threaded pin 51' of the pivot axle 17'.

Another difference between the embodiment of the hinge mount according to FIGS. 4 and 5 and the embodiment according to FIGS. 2 and 3 is the arrangement of the spiral spring 42 for the return of the backrest with no opposition. In this modification, the spiral spring 42 has its outer end connected to a bolt 53 projecting from a strap 52 which at its other end is pivotably mounted by means of a pivot pin 54 to the adjustable hinge mount member 14. This pivotable attachment of the return spring 42 to the mount member 14 by means of the pivotable strap 52 the wobbling movement of the hinge mount member 14 is damped with respect to the return spring 42. The operation of the adjustable hinge mount according to FIGS. 4 and 5 is analogous to that of the embodiment according to FIGS. 2 and 3.

It will be understood that each of the elements described above, or two or more together, may also find a useful application in other types of constructions differing from the types described above.

While the invention has been illustrated and described as embodied in specific examples of the adjustable hinge mount, it is not intended to be limited to the details shown, since various modifications and structural changes may be made without departing in any way from the spirit of the present invention.

For instance, the pressure rings or disks 40 and 44 can be supported for joint rotation and for the axial displacement on the pivot axle 17 or 17' in a different way than by means of the illustrated opposite fed portions of the axis and the corresponding noncircular opening in the pressure disk 40 or 44. Instead, a nut and spring or a keyway between the axle 17 or 17' and the pressure ring 40 or 44 can be employed. Also, instead of the torsional spring 37 in the form of a spiral spring there can be employed pressure springs, tension springs or other cushion like structural elements.

Without further analysis, the foregoing will so fully reveal the gist of the present invention thatothers can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An adjustable hinge mount for seats having a seat part and a reclinable backrest, comprising: a fixed hinge mount member attached to the seat part and a tiltable hinge mount member attached to the backrest; a pivot axle rigidly connected to one of said hinge mount members; an eccentric disk support for rotation on said axle; a wobble gear assembly including an inner gear formed on the hinge mount member and a spur gear formed on the other hingemount member and being in mesh with said spur gear; a sleeve having an outer surface coaxially splined to said spur gear, and an inner surface supported for rotation on said eccentric disk; and means for selectively locking said eccentric disk to said sleeve and said sleeve to said axle to arrest said reclinable backrest in an adjusted angular position relative to said seat part.

2. An adjustable mount as defined in claim 1, wherein said eccentric disk is provided with a collar, said sleeve having an end face resting on said collar, and an opposite end face arranged in close proximity to said one hinge mount, and said locking means establishing frictional coupling between the end faces of said sleeve, said collar, and said one hinge mount.

3. The hinge mount as defined in claim 2 wherein said pivot axle is at one end thereof rigidly connected to said fixed hinge mount member and having a blank section for supporting said eccentric disk and a projecting end section in the form of a threaded pin, and said locking means including a locking nut engaging said threaded pin and a control lever actuating said locking nut to selectively couple and uncouple said eccentric disk via said sleeve to and from said pivot axle.

4. The hinge mount as defined in claim 3 wherein said locking means further include a pressure disk support for axial displacement on said pivot axle between said locking nut and said eccentric disk.

5. The hinge mount as defined in claim 4 wherein the facing surfaces of said pressure disk and of said eccentric disk are provided with engageable radial serrations.

6. The hinge mount as defined in claim 4 further including spring elements arranged between the facing surfaces of said pressure disk and said eccentric sleeve and between said eccentric sleeve and said fixed hinged mount member, said spring elements acting in axial direction to facilitate the disengagement of said eccentric disk from said locking nut.

7. The hinge mount as defined in claim 6 wherein said spring elements are corrugated spring rings.

8. The hinge mount as defined in claim 3 wherein said locking nut is provided on its outer surface with a spur gear and said control lever is formed with an inner gear segment engaging said spur gear.

9. The hinge mount as defined in claim 8 wherein said control lever is in the form of a bell crank supported for rotation and in axial displacement on a pivot pin projecting from said fixed hinge mount member.

10. The hinge mount as defined in claim 3 wherein said control lever is spring biased to axially displace said locking nut into its locking position.

11. The hinge mount as defined in claim 10 wherein said locking means include a biasing spring for said control lever, the ends of said biasing spring being rigidly connected between said control lever and said tiltable hinge mount chamber.

12. The hinge mount as defined in claim 1 further including roller bearings disposed between the outer surface of said eccentric disk and said sleeve and an additional roller bearing disposed between said axle and said eccentric disk.

* * * * *